C. H. QUINN.
TENSIONING DEVICE FOR AXLE DRIVEN GENERATORS.
APPLICATION FILED NOV. 30, 1920.
1,376,902.
Patented May 3, 1921.
2 SHEETS—SHEET 1.
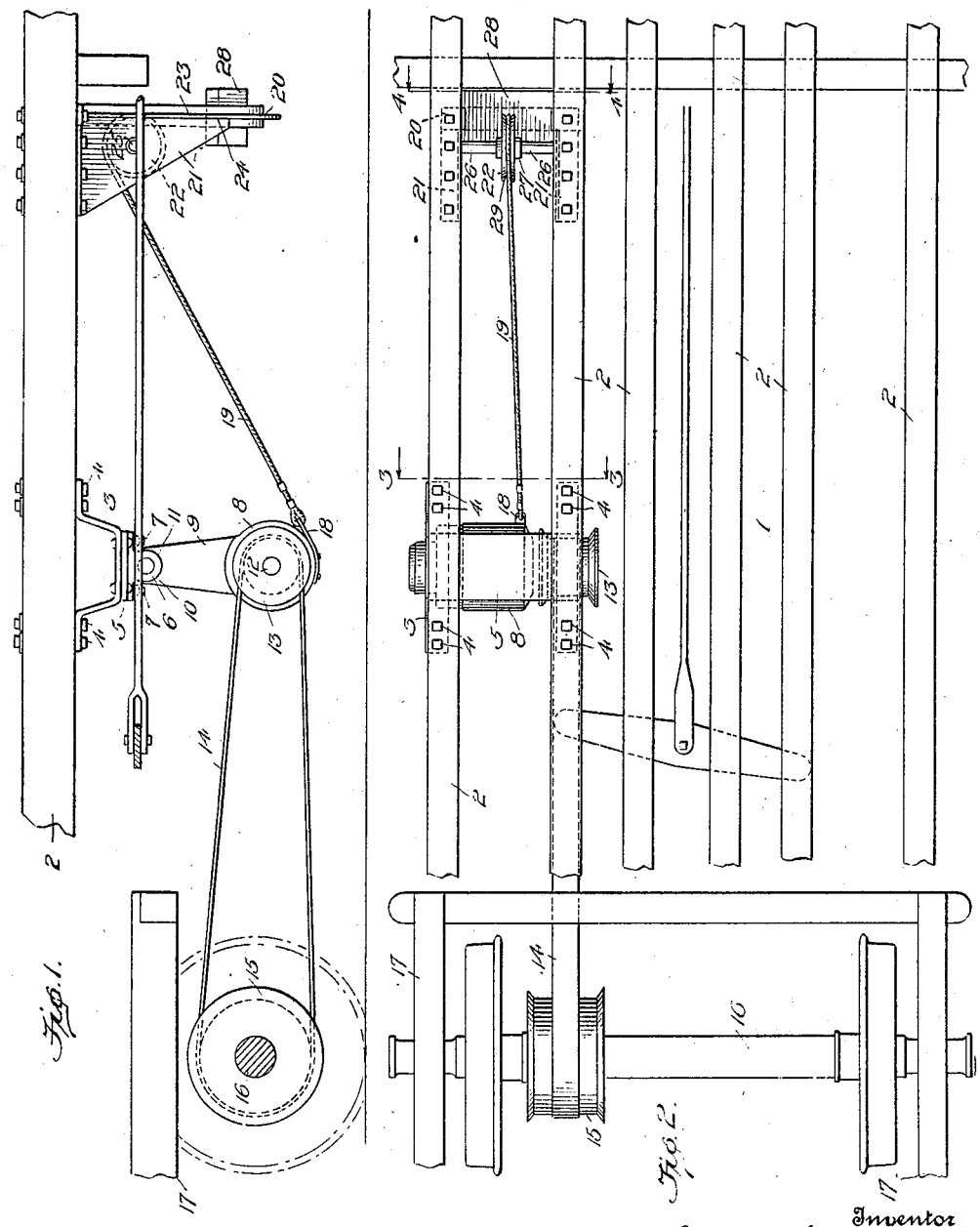

C. H. QUINN.
TENSIONING DEVICE FOR AXLE DRIVEN GENERATORS.
APPLICATION FILED NOV. 30, 1920.

1,376,902.

Patented May 3, 1921.
2 SHEETS—SHEET 2.

Witness
Edwin L. Bradford

Inventor
Charles H. Quinn
By
his Attorney

UNITED STATES PATENT OFFICE.

CHARLES HENRY QUINN, OF ROANOKE, VIRGINIA.

TENSIONING DEVICE FOR AXLE-DRIVEN GENERATORS.

1,376,902.                Specification of Letters Patent.    Patented May 3, 1921.

Application filed November 30, 1920. Serial No. 427,376.

*To all whom it may concern:*

Be it known that I, CHARLES H. QUINN, a citizen of the United States, residing at Roanoke, in the county of Roanoke and State of Virginia, have invented certain new and useful Improvements in Tensioning Devices for Axle-Driven Generators; and I do hereby declare the following to be a full, clear, and exact description of the invention, such as will enable others skilled in the art to which it appertains to make and use the same.

The invention relates to generators for use on railway cars, and more particularly to car axle driven generators which are pivotally supported upon the car underframe as contradistinguished from that class of generators which are supported by the truck frames.

The principal object of my invention, broadly stated, is to provide means carried by the car underframing for suitably tensioning the belt mechanism by which a generator of the type above described is connected to the car axle.

Another object of the invention is to provide a simple form of tensioning mechanism carried by the car framing and so connected to the generator as to afford a substantially constant pull upon the generator under all conditions of service.

Another feature of my invention relates to the particular form of support for the generator belt tensioning device. There are other novel features of the invention as will hereinafter be pointed out in connection with the detailed description of the single embodiment of device which has been illustrated in the accompanying drawings, wherein—

Figure 1 is a fragmentary view in side elevation of a portion of the car underframe and a portion of the truck showing a generator operatively connected to the axle, and also illustrating the improved form of belt tensioning means;

Fig. 2 is a top plan view of the construction shown in Fig. 1;

Throughout the specification and drawings like parts are designated by like reference characters.

Figure 3:
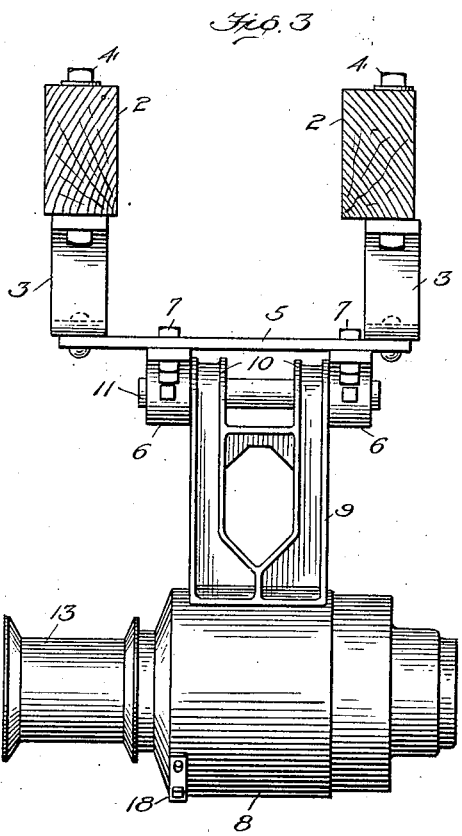
Fig. 3 is a section on line 3—3 of Fig. 2, the section being viewed in the direction indicated by the arrows at the end of the section line.
Figure 4:
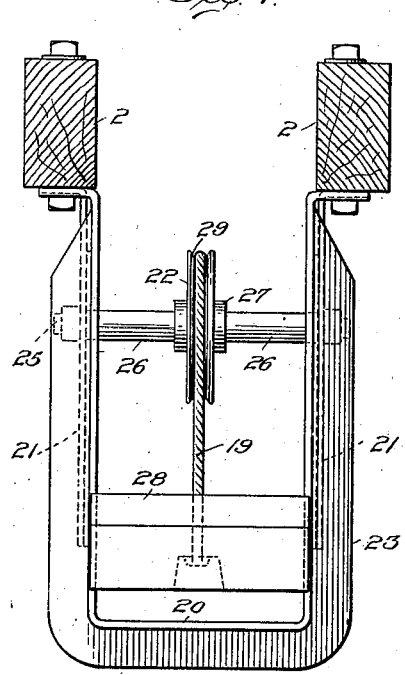
Fig. 4 is a similar view, taken however, on line 4—4 of Fig. 2 and viewed in the direction indicated by the arrows adjacent the end of the section line.
Figure 5:
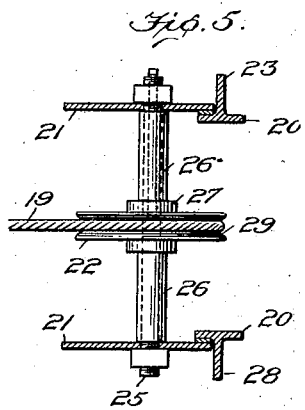
Fig. 5 is a transverse sectional view taken through the shaft and pulley illustrated in Fig. 4.

The car underframe is designated by the reference numeral 1, and at a suitable point thereon I provide the longitudinal sills 2 with brackets 3, 3. These brackets may be fastened to the sills in any convenient manner, as for example by means of the bolts 4. Preferably the lower faces of the said brackets 3 are connected by a tie or cross member 5, and from the latter the bearings 6 depend, the said bearings being for convenience illustrated as bolted to the said plate or cross member 5 by means of bolts 7.

The generator 8, which may be of any desired type, is pivotally supported or swung from the bearings by means of a bracket 9 which may be formed integral with the body of the generator, the said bracket 9 having upwardly projecting pivot ears 10 through which the pintle 11 extends, the outer ends of the said pintle being received in the brackets 6. The rotary member 12 of the said generator is provided with a pulley 13 around which the belt 14 extends, the said belt also extending around the pulley 15 which is rigidly connected to the axle 16 carried by the truck framing 17.

To the generator is connected in any suitable manner a clip or lug 18 to which is attached a flexible cable or member 19.

To maintain the belt 14 in driving relationship with the pulleys 13 and 15 I provide a simple form of gravity acting tensioning mechanism which comprises a U-shaped bracket 20 rigidly connected to the sills 2 in rear of the brackets 3 and suitably spaced therefrom. To brace the U-shaped bracket 20 and to form a support for the pulley 22 I provide a pair of angle bars 21 each of which is connected to one of the said sills 2 in any convenient manner and each of which is adapted to engage a portion of the said bracket to maintain the same in upright position. For convenience I form the bracket 20 from T-section metal the outwardly projecting web 23 thereof being adapted to be engaged by the upright faces 24 of the said angle brackets 21. The pulley 22 is preferably mounted on an axle 25 carried by the brackets 21, and in order to maintain the pulley 22 in central position sleeves or collars 26 are interposed between the pulley hub 27 and the adjacent faces of the angle members 21.

Slidably mounted within the U-shaped bracket 20 are a plurality of weights 28, said weights being suitably recessed at the edges to engage the flanges of the said bracket to prevent transverse movement of the said weights with respect to the said bracket 20, and the flexible cable 19 hereinbefore referred to is adapted to extend over the pulley 22, which is preferably provided with a grooved or recessed face 29, and through the weights 28 to which it is suitably connected.

It will be readily apparent that the weights 28 acting through the flexible cable 19 will exert a constant tension upon the generator 8 and that this tension will be in opposition to the belt 14. Therefore it will be seen that the weight 28 will tend to maintain the belt 14 taut and in driving engagement with the pulleys 13 and 15. By providing a rigid bracket as a support for the pulley 22 and as a guide for the weights 28, all tendency of the weights 28 to swing with the movement of the car is avoided and a substantially constant tension is placed upon the generator under all conditions of service.

It will also be obvious that the tension upon the generator can be regulated to a nicety by adding to or subtracting from the number of weights within the bracket 20, and all stretching of the belt 14 can be taken care of by merely shortening the flexible cable 19 in any suitable manner.

Having now described my invention, what I claim and desire to secure by Letters Patent is:—

1. In a car underframe, the combination with a generator swingingly mounted upon said underframe, of means for operatively connecting said generator to a source of power, and flexible means for connecting said generator to a gravity acting tensioning device and means carried by said underframe for guiding the movements of said tensioning device.

2. In a car underframe, the combination with a generator swingingly mounted upon said underframe, of means for operatively connecting said generator to a car axle, and a vertically movable weight carried by said underframe, the latter being furnished with guides adapted to prevent lateral movement of said weight, and means for connecting said generator to said weight.

3. In a car underframe, the combination with a generator pivotally supported from said underframe, of a belt for connecting said generator to a car axle, a bracket rigidly connected to the underframe, a weight slidably mounted within said bracket, and flexible means for connecting said weight and generator, said weight serving to maintain a predetermined tension on said belt.

4. In a car underframe, the combination with a generator mounted upon said underframe, of a belt for connecting said generator to a car axle, a bracket rigidly connected to said underframe, a weight slidably mounted within said bracket, a pulley carried by said bracket, and flexible means connected to the generator and to said weight and passing over the said pulley, whereby a constant tension is maintained on said generator.

In testimony whereof I affix my signature.

CHARLES HENRY QUINN.